(12) United States Patent
Peters et al.

(10) Patent No.: US 6,320,922 B1
(45) Date of Patent: Nov. 20, 2001

(54) TOOL FOR RETRACTING FUEL RODS FROM AND INSERTING FUEL RODS INTO A NUCLEAR FUEL ASSEMBLY AND METHODS THEREFOR

(75) Inventors: William C. Peters, Wilmington; David G. Smith, Leeland; Edward G. Apple, Jr., Wilmington, all of NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/307,032

(22) Filed: May 7, 1999

(51) Int. Cl.[7] .................................................. G21C 19/105
(52) U.S. Cl. ............................................ 376/264; 376/268
(58) Field of Search .................................... 376/261, 264, 376/268, 271

(56) References Cited

U.S. PATENT DOCUMENTS

| 4,204,910 | * | 5/1980 | Koshkin et al. | 176/30 |
| 4,269,558 | * | 5/1981 | Coppa et al. | 414/146 |
| 4,297,776 | * | 11/1981 | Fogg | 29/252 |
| 4,374,801 | * | 2/1983 | Albin | 376/264 |
| 4,747,997 | * | 5/1988 | Boatwright | 376/261 |
| 5,280,508 | * | 1/1994 | Okashima et al. | 376/261 |
| 5,825,837 |   | 10/1998 | Peters et al. | 376/261 |

FOREIGN PATENT DOCUMENTS

| 3012997 | * | 1/1988 | (JP) | 376/261 |
| 2051097 | * | 2/1990 | (JP) | 376/261 |

* cited by examiner

*Primary Examiner*—Michael J. Carone
*Assistant Examiner*—Kevin Mun
(74) *Attorney, Agent, or Firm*—Nixon & Vanderhye

(57) ABSTRACT

The extraction tool includes an inner rod pivotally mounting at its distal end a pair of collet sections having mechanical clamping jaws. An outer tube may be advanced and retracted axially relative to the inner rod by a locking tube nut threaded on a sleeve forming part of the inner rod. The inner rod and outer tube are non-rotationally engaged with one another. By axially displacing the outer tube relative to the inner rod, the collet sections are movable between collet-open and closed positions such that the jaws of the collet can respectively grasp and release the barbed end of the end plug of the fuel rod.

7 Claims, 4 Drawing Sheets

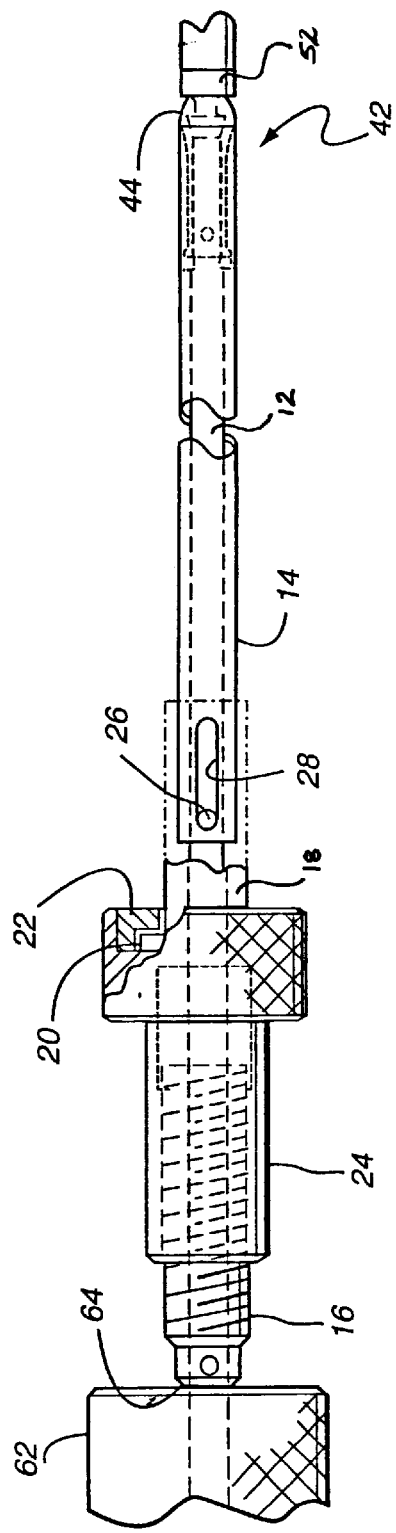
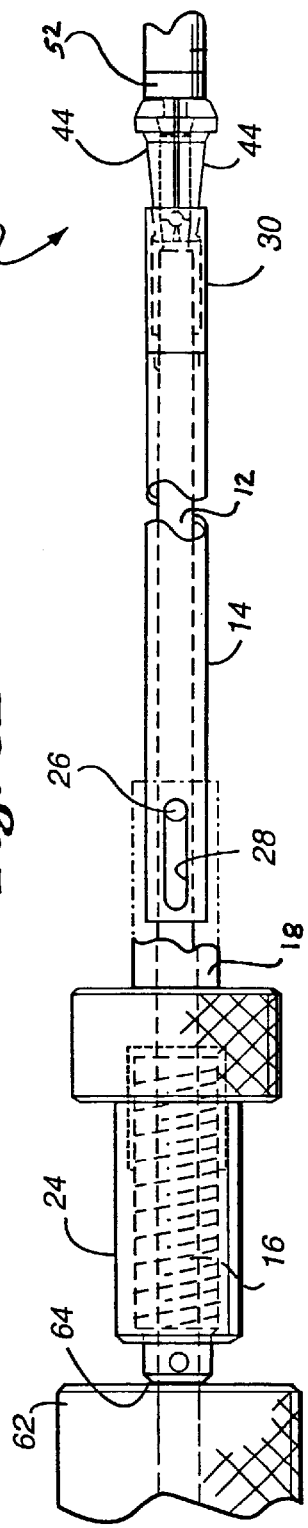

TOOL FOR RETRACTING FUEL RODS FROM AND INSERTING FUEL RODS INTO A NUCLEAR FUEL ASSEMBLY AND METHODS THEREFOR

TECHNICAL FIELD

The present invention relates to a tool for extracting both full-length and partial-length fuel rods from and inserting such rods into nuclear fuel assemblies and to methods of extracting and inserting the fuel rods relative to the assemblies.

BACKGROUND OF THE INVENTION

Nuclear fuel bundle assemblies in boiling water nuclear reactors typically include a plurality of fuel rods extending in generally parallel relation one to the other from a lower tie plate. A plurality of fuel rod spacers are spaced one from another along the length of the fuel bundle assembly to maintain the lateral spacing of the fuel rods relative to one another. In addition to full-length fuel rods, fuel bundles often include part-length fuel rods which extend upwardly from the lower tie plate through a fewer number of the spacers than do the full-length fuel rods and which part-length fuel rods terminate below the upper ends of the full-length fuel rods. Additionally, one or more water rods typically upstand from the lower tie plate.

In certain fuel bundle assemblies, mechanical support for the fuel bundle is provided by a threaded connection between a pair of central water rods and the lower tie plate. Thus, the lower ends of the full-length and part-length fuel rods terminate in end plugs receivable in and axially removable from openings in the lower tie plate. Additionally, the upper ends of the full-length and part-length fuel rods have similar type end plug terminating in barbed end caps. These upper end caps facilitate removal of one or more of the fuel rods from the nuclear fuel assembly.

It will be appreciated that the fuel rods, both full-length and part-length, are not readily accessible since they are internal to the fuel bundle assemblies and do not extend up to the top of the water rod tie bar. Moreover, the full-length rods are held in place by spacers, typically about eight or nine spacers, and require a substantial force, for example, as much as 70 pounds, to axially withdraw each fuel rod from the fuel bundle assembly. The part-length rods are held by a lesser number of spacers, e.g., three spacers, and do not require as much axial force for their removal. However, the part-length rods are snapped into the lower tie plate with specially designed lower end plugs which require additional axial force for removal.

In order to withdraw a fuel rod from the fuel bundle assembly, an extractor must be able to be inserted and removed from the fuel bundle without damaging any of the assembly components including the fuel rod upper end caps, the fuel rods per se and the spacers and must pass through the assembly of fuel rods in the assembly, as well as ancillary fuel bundle structure. Further, the extractor tool must have the capacity to engage the barbed end cap of the upper end plug so that it can be used to not only withdraw the fuel rod but to reinsert a fuel rod and to reseat a partial or full-length fuel rod lower end plug into the lower tie plate. Finally, the extractor tool must be able to releasably lock onto the fuel rod's upper end plug's barbed cap so that the fuel rod can be withdrawn from the lower tie plate and the fuel assembly with the necessary pulling force, e.g., as much as 60 to 70 pounds.

BRIEF SUMMARY OF THE INVENTION

In accordance with a preferred embodiment of the present invention, there is provided an extractor tool which can be easily and quickly inserted into and removed from a nuclear fuel bundle assembly and which tool is engageable with the upper end plugs of both full-length and part-length fuel rods in a manner to releasably lock about the end plugs to enable the fuel rods to be withdrawn and reinserted into the fuel bundle assembly. To accomplish the foregoing, the extractor tool of a preferred embodiment of the present invention includes an inner rod typically pivotally mounting split sections of a collet at a fuel rod engaging end thereof, an outer tube disposed about and coaxial with the inner rod and a drive element cooperable between the inner rod and outer tube for axially displacing the inner rod and outer tube relative to one another without relative rotation thereof such that the collet sections are cammed between open and closed positions. Particularly, the collet sections preferably comprise generally semi-cylindrical sections having flanged ends for engaging below a barbed end of the fuel rod end plug. The collet sections are pivotally mounted to the end of the inner rod and are cammed by relative axial displacement of the outer tube and inner rod between the open and closed collet positions.

The extractor tool also includes a drive element threaded onto the inner rod. The drive element is rotatable relative to the outer tube and axially advances or retracts the outer tube relative to the inner rod upon threading the drive element and inner rod in opposite directions, respectively. A pin prevents rotation of the outer tube and inner rod relative to one another thereby preventing rotation of the outer tube relative to the spacers and fuel rods upon insertion of the extractor tool into the fuel bundle to engage and withdraw a fuel rod. Additionally, a slide hammer is provided on the inner rod for impacting an anvil surface on the inner rod when the inner rod engages the end plug to jar loose the engaged fuel rod should it be stuck in position engaged in the fuel bundle.

To use the extractor tool hereof, the drive element is threaded on the inner rod to advance the outer tube relative to the inner rod to close the collet sections. When closed, the extractor tool is inserted into the fuel bundle assembly and preferably engages the closed collet with the top face of the end plug of the fuel rod to be withdrawn. The tool may then be backed off the end plug and the drive element rotated to withdraw the outer tube relative to the inner rod camming the collet sections into the open position. By then axially advancing the extractor tool, the open collet jaws straddle the barbed end of the end plug at the same time the end face of the inner rod engages the end face of the end plug locating the tool axially relative to the end plug. The drive element is threaded in the opposite direction to advance the outer tube relative to the inner rod to close the collet jaws about the end cap. When closed, the extractor tool can be axially withdrawn to remove the fuel rod from the fuel bundle assembly. Should the fuel rod lie stuck in the bundle assembly, the slide hammer can be impacted against the inner rod anvil to jar loose the fuel rod.

The tool can also be used to insert full-length and part-length fuel rods into the fuel assembly. The foregoing described procedure for extraction can be reversed for fuel rod insertion.

In a preferred embodiment according to the present invention, there is provided a tool for displacing fuel rods in nuclear fuel bundle assemblies, comprising an elongated inner rod, an elongated outer tube coaxial about and axially movable relative to the inner rod, a collet carried by the inner rod including collet sections each having a distal end for engaging an end plug of a fuel rod, the collet sections being movable between collet-open and collet-closed positions in response to relative axial movement of the inner rod and the outer tube, a threaded portion carried by the inner rod and a drive element threaded to the threaded portion and coupled to the outer tube for axially displacing the outer tube and the rod relative to one another in response to threading the drive element and the threaded portion relative to one another to move the collet sections between the open and closed positions.

In a further preferred embodiment according to the present invention, there is provided a method of extracting elongated fuel rods having end plugs terminating in end caps from a nuclear fuel assembly employing an extractor tool having an inner rod, an outer tube coaxially about and axially movable relative to the inner rod and a collet at an end of the tool having end cap engaging sections movable between an open position spaced from the end cap and a closed position engaging about the end cap, comprising the steps of (a) inserting the extractor tool into the fuel assembly with the collet sections in a closed position, (b) relatively displacing the rod and the tube in a first axial direction to move the collet sections into an open position, (c) advancing the extractor tool into the fuel assembly to enable the open collet sections to straddle the end cap, (d) relatively displacing the rod and the tube in a second opposite axial direction to move the collet sections into the closed position engaging about the end cap and (e) jointly displacing the rod and the tube in an axial direction to withdraw the engaged fuel rod from the fuel assembly.

In a still further preferred embodiment according to the present invention, there is provided a method of inserting an elongated fuel rod having a first end plug terminating in an end cap into a nuclear fuel assembly employing an insertion tool having an inner rod, an outer tube coaxially about and axially movable relative to the inner rod and a collet at an end of the tool having end cap engaging sections movable between an open position spaced from the end cap and a closed position engaging about the end cap, the fuel rod having a second end plug at an end thereof opposite the first end plug, comprising the steps of (a) relatively displacing the rod and the tube in a first axial direction to move the collet sections into an open position, (b) relatively displacing the tool and fuel rod to enable the open collet sections to straddle the end cap of the first end plug, (c) relatively displacing the rod and the tube in a second opposite axial direction to move the collet sections into the closed position engaging about the end cap, (d) inserting the tool and engaged fuel rod axially into the fuel assembly with the collet sections in the closed position about the end cap and (e) inserting the second end plug into an opening in a tie plate of the fuel assembly.

BRIEF DESCRIPTION OF THE DRAWINGS

FIGS. 3A and 3B illustrate the relative positions of the parts of the tool with the collet sections closed and opened, respectively, about the fuel rod end plug;

DETAILED DESCRIPTION OF THE INVENTION

Figure 1:
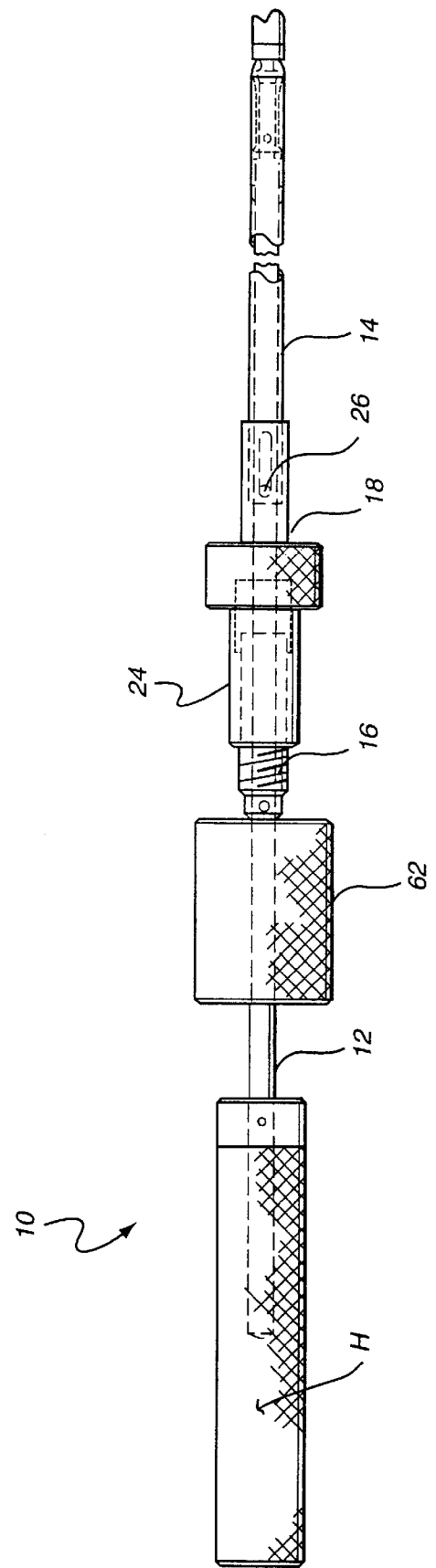
FIG. 1 is a side elevational view of a tool constructed in accordance with a preferred embodiment of the present invention with parts broken out for ease of illustration and illustrated in engagement with an end plug of a fuel rod.
Figure 2:
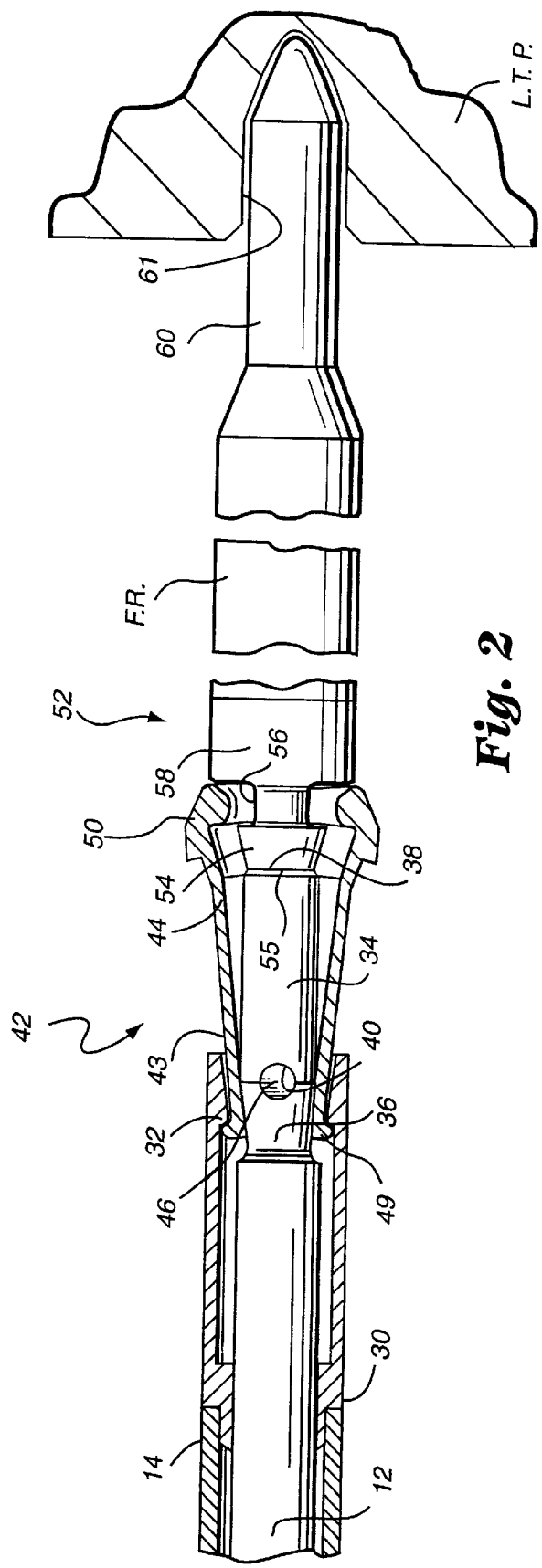
FIG. 2 is an enlarged fragmentary cross-sectional view of an end of the tool illustrating its engagement with the end plug of a fuel rod.

Referring now to the drawings, particularly to FIGS. 1 and 2, there is illustrated a preferred embodiment of a tool, generally designated 10, constructed in accordance with the present invention. Tool 10 is useful both as an extractor tool for extracting fuel rods from a fuel assembly and as an insertion tool for inserting fuel rods into the fuel assembly. Tool 10 includes an inner rod 12 mounting a handle H at one end and which rod 12 is, in part surrounded by a coaxially extending outer tube 14. An externally threaded portion or locking sleeve 16 is secured to the inner rod 12 by a pinned connection at an intermediate location along the rod. A cover sleeve 18 is secured to the proximal end of the outer tube 14, for example, by welding. The opposite end of the cover sleeve 18 includes a flange 20 (FIG. 3A) rotatably received within an internal recess of a retaining ring 22 secured by bolts to a locking tube nut 24. It will be appreciated that, with the flange 20 locked by the retaining ring 22 to the locking tube nut 24, the outer tube 14, cover sleeve 18 and locking tube nut 24 are jointly axially displaceable while the locking tube nut 24 is rotatable relative to the cover sleeve 18, outer tube 14 and threaded locking sleeve 16. The locking tube nut 24 is internally threaded for threaded engagement with the locking sleeve 16 and serves as a drive element as described below.

Inner rod 12 also includes a laterally extending pin 26. The pin 26 is received in a slot 28 formed through a side wall of the outer tube 14. The outer sleeve 18 overlies the end of the pin 26 received in the slot 28 but is not connected to the pin 26. As a consequence, it will be appreciated that the pin 26 prevents relative rotation between the inner rod 12 and outer tube 14 while enabling relative axial movement of the inner rod 12 and outer tube 14 to the limited extent of the slot 28.

With the above described arrangement, it will be appreciated that rotating the locking tube nut 24 in a direction to cause the locking sleeve 16 to thread relative to the tube nut 24 for movement to the right in FIG. 1 the pin 26 will advance to the opposite of the slot, i.e., as illustrated in FIG. 3B. Rotation of the locking tube nut 24 in the opposite direction causes relative displacement of the inner rod 12 and outer tube 14 to the position illustrated in FIG. 3A, locating the locking pin 26 in the left-hand end of slot 28 as illustrated. Consequently, the inner rod 12 and outer tube 14 are axially displaceable relative to one another for the full extent of the length of the slot 28.

Referring to FIG. 2, the outer tube 14 terminates in an outer sleeve 30 having a split inwardly directed flange 32 at its distal end. The end of inner rod 12 is reduced in diameter at 34 and has a transitional outwardly tapered section 36 between its end 34 and the inner rod proper. The end of the inner rod 12 terminates in a flat end face 38. An opening 40 extends laterally through the end of inner rod 12 adjacent to the transition between the reduced diameter section 34 and tapered section 36.

Figure 4A:
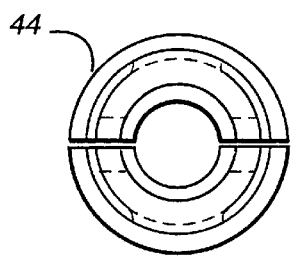
FIG. 4A is an end elevational view of the collet sections illustrated in FIG. 4.
Figure 4:
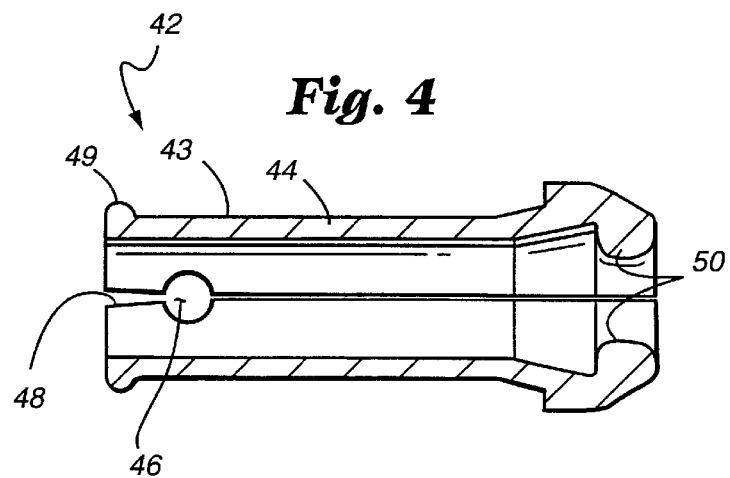
FIG. 4 is an enlarged longitudinal cross-sectional view through the closed collet sections at the end of the tool.
Figure 5A:
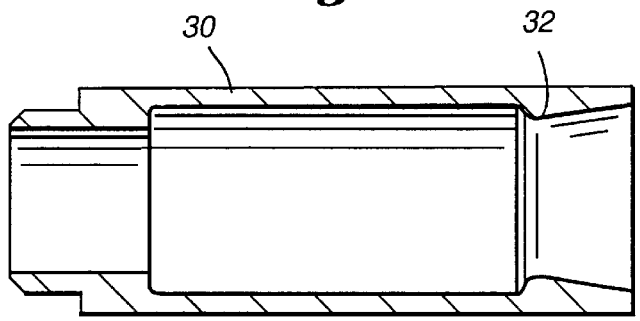
FIG. 5A is a cross-sectional view of the collet sleeve of FIG. 5.
Figure 5:
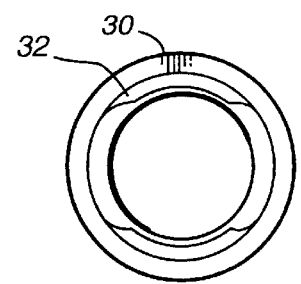
FIG. 5 is an end view of an outer sleeve forming part of the outer tube for engaging the collet sections.

Referring to FIGS. 2, 4 and 4A, there is provided at the end of tool 10 a collet, generally designated 42, having split collet sections 44 which are the mirror images of one another. The split collet sections 44 have generally semicircular aligned openings at lateral sides thereof for receiving the pin 46 extending through the opening 40 of the inner rod 12. The proximal ends of the split collet sections 44 are tapered at 48 (FIG. 4) to permit the collet sections to pivot about pin 46 between opened and closed positions with a clearance along a diametrical plane. The proximal end of the collet sections also have split flanges 49 for reception in the open areas between the split flanges 32 of the outer sleeve 30 to facilitate assembly of the collet sections 44, distal end of inner rod 12 and the outer sleeve 30. The distal ends of collet sections 44 include jaws 50.

Referring to FIG. 2, a first end plug 52 of a nuclear fuel rod F.R. includes a barbed end cap 54 having a flat end face 55 and a tapered distal end portion defining a groove or neck portion 56 with the body 58 of the end plug 52. The tapered and neck portions 54 and 56 are circular in configuration and form a barbed end on the end plug 52. The jaws 50 of the split collet sections are geometrically sized for reception about the neck portion 56 between the tapered section 54 and the main body 58 of the end plug 52. With this design, capture and retention of end plug 52 by barbed area 54 and neck 56 is fully mechanical and does not rely on springs or other ancillary moving parts. The opposite end of the nuclear fuel rod F.R. mounts a second or lower end plug 60 which is generally cylindrical in shape for reception in or a snap fit with a complementary-sized opening 61 in the lower tie plate L.T.P.

To use the tool of the present invention to extract a fuel rod from a nuclear fuel bundle, the collet end of the extractor tool 10 is initially closed. With the collet closed, the extractor tool 10 is inserted axially into the fuel bundle through the spacer openings or ferrules in axial alignment with the end plug mounted on the fuel rod desired to be removed. The tool 10 may be inserted to the extent that the collet, i.e., the end faces of jaws 50, butts the end face 55 of the end plug 52. The tool may then be slightly backed off the end plug 52. The locking tube nut 24 is then rotated in a direction causing the outer tube 14 to be withdrawn relative to the inner rod 12. Upon withdrawal of the outer tube 14, the flanges 32 of the outer sleeve 30 cam against the split flanges 49 of the collet sections 44 to pivot the collet sections 44 about pin 46, displacing the jaws 50 away from one another into a collet-open position. Once opened, the extractor tool can be axially advanced to butt the end face 38 of the inner rod 12 against the end face of the end cap surface 55. With this abutting arrangement, the jaws 50 straddle the neck portion 56 of the end cap. By rotating the locking tube nut 24 in an opposite direction threading on locking sleeve 16, the outer tube 14 is advanced relative to the inner rod 12 whereby flanges 32 cam along the outer surfaces 43 of collet sections 44, displacing the sections 44 toward one another and the jaws 50 into the annular slot straddling neck portion 56. With the end cap thus engaged by the collet, the extractor tool and fuel rod can be withdrawn axially from the fuel bundle.

In the event the fuel rod is stuck or cannot be readily axially withdrawn, a slide hammer 62 on the inner rod 12 can be impacted upwardly against the handle H or downwardly against the end 64 of the locking sleeve 16, the locking sleeve end or handle in effect forming anvils for the hammer. In this manner, the fuel rod can be jarred loose such that the extractor tool can then withdraw the fuel rod from the fuel bundle.

It will be appreciated that a fuel rod can be disposed in a bundle using the tool hereof as an insertion tool. With the collet engaged about the upper end cap of the fuel rod, the fuel rod and extractor tool can be inserted into the bundle with the fuel rod passing through the openings or ferrules of the spacers. Because of the tapered end of the lower end plug 60, the fuel rod end plug 60 can be inserted or snapped into a complementary opening in the lower tie plate. The hammer and anvil arrangement can be employed to drive or further insert the fuel rod into the tie plate opening by impacting hammer 62 against sleeve 16. Upon final insertion of the fuel rod, the locking tube nut 24 can be threaded on sleeve 16 to withdraw the outer tube 14 relative to the inner rod 12 to displace the collet sections to a collet-open position whereby the tool can be displaced upwardly above the end plug. Once disposed above the end plug and before the collet can be withdrawn through the opening or ferrule of the spacers above the fuel rod end plug, the locking tube nut 24 is threaded on sleeve 16 to close the collet sections, thereby reducing the diameter of the collet to a size for reception through the spacer openings or ferrules to facilitate withdrawal of the tool 10 from the fuel bundle assembly.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of extracting elongated fuel rods having end plugs terminating in end caps from a nuclear fuel assembly employing an extractor tool having an inner rod, an outer tube coaxially about and axially movable relative to said inner rod and a collet at an end of said tool having end cap engaging sections positively pivotable by a camming action about a pin carried by the inner rod between an open position spaced from the end cap and a closed position engaging about said end cap, comprising the steps of:

(a) inserting said extractor tool into the fuel assembly with said collet sections in a closed position;

(b) relatively displacing said inner rod and said tube in a first axial direction to positively cam and thereby pivot said collet sections about the pin into an open position;

(c) advancing the extractor tool into the fuel assembly to enable the open collet sections to straddle said end cap;

(d) relatively displacing said inner rod and said tube in a second opposite axial direction to positively cam and thereby pivot said collet sections about the pin into said closed position engaging about said end cap; and (e) jointly displacing said inner rod and said tube in an axial direction to withdraw the engaged fuel rod from said fuel assembly.

2. A method according to claim 1 including, subsequent to step (c) and prior to step (d), engaging an end face of the inner rod against the end cap to position the tool and end plug relative to one another in an axial direction.

3. A method according to claim 1 including engaging an end of said inner rod against the end cap, and displacing a weight along said tool to impact said inner rod while engaged with the end cap against the end plug.

4. A method according to claim 1 wherein steps (b) and (d) include threading a drive element relative to said inner rod to axially displace said inner rod and said outer tube in the first and second axial directions.

5. A method according to claim 4 including maintaining said inner rod and said outer tube non-rotationally oriented relative to one another while said inner rod and said outer tube are axially displaced relative to one another.

6. A method of inserting an elongated fuel rod having a first end plug terminating in an end cap into a nuclear fuel assembly employing an insertion tool having an inner rod, an outer tube coaxially about and axially movable relative to said inner rod and a collet at an end of said tool having end cap engaging sections positively pivotable by a camming action about a pin carried by the inner rod between an open position spaced from the end cap and a closed position engaging about said end cap, the fuel rod having a second end plug at an end thereof opposite said first end plug, comprising the steps of:

(a) relatively displacing said inner rod and said tube in a first axial direction to positively cam and thereby pivot said collet sections about the pin into an open position (b) relatively displacing the tool and fuel rod to enable the open collet sections to straddle said end cap of said first end plug;

(c) relatively displacing said inner rod and said tube in a second opposite axial direction to positively cam and thereby pivot said collet sections about the pin into said closed position engaging about said end cap;

(d) inserting said tool and engaged fuel rod axially into the fuel assembly with said collet sections in said closed position about said end cap; and (e) inserting said second end plug into an opening in a tie plate of the fuel assembly.

7. A method according to claim 6 including displacing a weight along said tool to impact said inner rod while the collet sections remain engaged with the end plug to further insert the second end plug into the tie plate opening.

* * * * *